United States Patent [19]
Kerr

[11] Patent Number: 6,071,052
[45] Date of Patent: Jun. 6, 2000

[54] EXTENDED HEIGHT LOCK NUT

[75] Inventor: Jack R. Kerr, DeSoto, Tex.

[73] Assignee: Lok-Mor, Inc., Arlington, Tex.

[21] Appl. No.: 08/885,673

[22] Filed: Jun. 30, 1997

[51] Int. Cl.⁷ ..................................................... F16B 39/34
[52] U.S. Cl. ........................................... 411/302; 411/247
[58] Field of Search ..................................... 411/303, 302, 411/246, 247, 260, 261, 429, 375

[56] References Cited

U.S. PATENT DOCUMENTS

| | | |
|---|---|---|
| 2,326,681 | 8/1943 | Richardson . |
| 2,450,694 | 10/1948 | Sauer . |
| 2,727,551 | 12/1955 | Rees . |
| 3,040,796 | 6/1962 | Gouverneur ............................ 411/303 |
| 3,115,918 | 12/1963 | Parr ........................................ 411/247 |
| 3,216,475 | 11/1965 | Jacobsen ................................ 411/261 |
| 3,299,933 | 1/1967 | Akashi .................................... 411/247 |
| 3,374,014 | 3/1968 | Kull ........................................ 411/375 |
| 3,522,830 | 8/1970 | Blizard . |
| 3,797,547 | 3/1974 | Shinjo . |
| 4,019,550 | 4/1977 | DeHaitre . |

FOREIGN PATENT DOCUMENTS

| | | | |
|---|---|---|---|
| 1073245 | 1/1960 | Germany ................ | 411/247 |

*Primary Examiner*—Flemming Saether
*Attorney, Agent, or Firm*—Daniel Rubin

[57] ABSTRACT

A method of forming a lock nut and the product thereof in which a coaxial extension is secured to the end face of a standard nut to receive a locking element therein. The extension is comprised of a concentric metal ring secured at one edge to the end face of a standard nut and at the other edge secures a locking element against the end face of the nut.

11 Claims, 1 Drawing Sheet

EXTENDED HEIGHT LOCK NUT

FIELD OF THE INVENTION

The field of art to which the invention relates comprises lock nut fasteners utilized to resist loosening from fastener bolts on which the nuts are mounted.

BACKGROUND OF THE INVENTION

Nut fasteners forming threaded joints with bolts on which they are assembled are subject to dynamic loads, stress reversals, shock, vibration and radical atmospheric fluctuations rendering them susceptible to undersireable loosening. When the joint design permits tightening of the nut fastener to high preload levels, the chances of nut loosening in service are significantly reduced. However, in many applications, the joint makeup, e.g. interposition of a soft gasket, accessory, etc. between the bolt and-nut is such that preload alone is inadequate and an assisting anti-loosening measure must be employed in order to maintain an installation standard. One such measure is the use of lock type fasteners.

Lock type fasteners in general comprise a broad family of mechanical fasteners each having a design capability to resist loosening after the fastener is assembled in its service application. They encompass both externally and internally threaded parts and are available commercially in a variety of different constructions.

Generally, lock type fasteners are characterized as falling into one of three basic categories, namely "free running", "prevailing torque", and "chemical reaction". The "free running" lock type nut fastener assembles freely until seated. It then gains resistance to loosening through the presence of an accessory device or through development of a tensile load in the externally threaded component as a result of tightening. The "prevailing torque" nut fastener typically has a self contained feature that creates frictional interference between the threads of the mating components. Finally, the "chemical reaction" fastener tends to adhesively bond mating threads through the application and reaction of chemicals deposited on or about the threads. They are primarily suited to applications intended to be permanent in that they have little, if any, re-use potential. Official regulation of the fastener nut industry is governed by the Industrial Fastener Institute (IFI) standard 100/107 or ANSI/ASME standard B18.2.2.

The common design principal of all lock type fasteners is to increase the break loose torque resistance between the nut and bolt. The major disadvantage of the free running type nut is that, when they break loose, resistance is overcome either through loss of fastener preload or ineffectiveness of the accessory device. Re-use resistance to fastener loosening becomes essentially zero and eventual disengagement of the mating parts becomes a possibility. Exemplary forms of free running lock type nut fasteners include jam nuts, cotter pins extending through a nut slot aligned with an aperture in the bolt shank; lock wire, lock washers, etc. The top lock form of lock nut is also free running until the top of the nut engages the bolt thread.

By contrast, prevailing torque type lock nut fasteners retain a continuing resistance to removal rotation even after fastener preload is fully dissipated so as to afford re-use suitability. Prevailing torque fasteners are typically of all metal that includes a thread modification of sorts or with an intervening non-metallic element added or fused to the threads. A form of prevailing torque lock nut is disclosed, for example, in U.S. Pat. No. 4,682,924 incorporated herein by reference.

BACKGROUND OF THE PRIOR ART

A common form of prevailing torque type lock nut uses a plastic insert such as poly, teflon or nylon that includes first counterboring one end of a metal nut to internally enlarge the nut while removing a portion of the threads. The insert is then installed within the enlarged bore diameter and cemented or otherwise secured in place. The insert is generally concentric with the nut with an internal diameter (ID) generally corresponding to the ID of the original threads. The disadvantage of that construction is that as a result of the end bore, the end product has a reduced length of metal threads compared to an otherwise standard nut of the same size.

Another approach has been to internally reduce the length of metal threads by boring while cutting back on the exterior height of the standard nut periphery about the bored end. This has the effect of producing a relatively thin walled neck about the bore in which to receive a suitable insert such as a nylon ring. After receiving the nylon ring, the thinned wall is rolled over to compressively secure the ring in place. With that construction, there is incurred not only a loss in metal thread length but at the same time, it also results in a substantial reduction in exterior wrenching surface about the nut. Exemplifying such constructions are the disclosures of U.S. Pat. Nos. 2,326,681; 2,450,694; 2,727,551; 3,522,830; 3,797,547 and 4,019,550.

Otherwise, producing nuts of oversized height using the added height to accommodate an insert has been regarded as impractical and not economically feasible.

As a consequence, it has not been known heretofore how to produce an insert type lock nut while maintaining a standard height wrenching surface and standard thread length on a standard height nut of a given size in a highly economical manner.

OBJECTS OF THE INVENTION

It is an object of the invention to provide a novel method for forming a full height insert type lock nut.

It is a further object of the invention to utilize the previous object to provide a novel end product affording vast versatility for industrial applications.

It is a still further object of the invention to effect the previous objects in an economical manner applicable to a variety of different nut types, sizes and metal compositions.

SUMMARY OF THE INVENTION

This invention relates to placing a plastic insert in a metal nut for effecting a lock nut thereof. More specifically, the invention relates to a method of manufacturing a lock nut and the lock nut product thereof containing a plastic insert such as nylon without reducing either the metal thread length or the body height of an original standard metal nut from which it is formed. The original nut can be of any given size and yet will consistently retain its thread length and body height in the course of being converted to a lock nut.

The foregoing is achieved in accordance with the invention by using a standard height metal nut of any given size having dimensions established by the Industrial Fastening Institute. Formed in the top or front face of the nut is a concentric annular groove or recess in which to receive a close fitting metal ring of thickness that varies in correlation to a given nut size. The metal ring contains an annular recess near its lower end and when placed in the recess of the nut in a seated relation, the ring recess coincides in location with the top end face of the nut. The nut end face is coldworked inward about the ring recess to achieve a firm gripping engagement therebetween. After securing the metal ring in place, a nylon ring or other suitable ring insert element to effect the lock nut feature is disposed within the metal ring that is then coldworked to secure the insert element in place. At that point, the lock nut product is completely ready for utilization without having altered either the thread length or body height of the standard nut of which it was formed.

The foregoing can be applied to jam nuts, heavy nuts, flange nuts, weld nuts, square nuts, high nuts, coupling nuts, hot dipped and mechanical galvanized nuts, specialized nuts, metric nuts, etc. moreover, materials of the various nuts can comprise low carbon, medium carbon, high carbon or stainless steel, monel, brass, bronze, aluminum, alloyed and other steels and metal alloys.

The above noted features and advantages of the invention as well as other superior aspects thereof will be further appreciated by those skilled in the art upon reading the detailed description which follows in conjunction with the drawings.

THE DESCRIPTION OF THE DRAWINGS

DESCRIPTION OF THE PREFERRED EMBODIMENT

Figure 1:
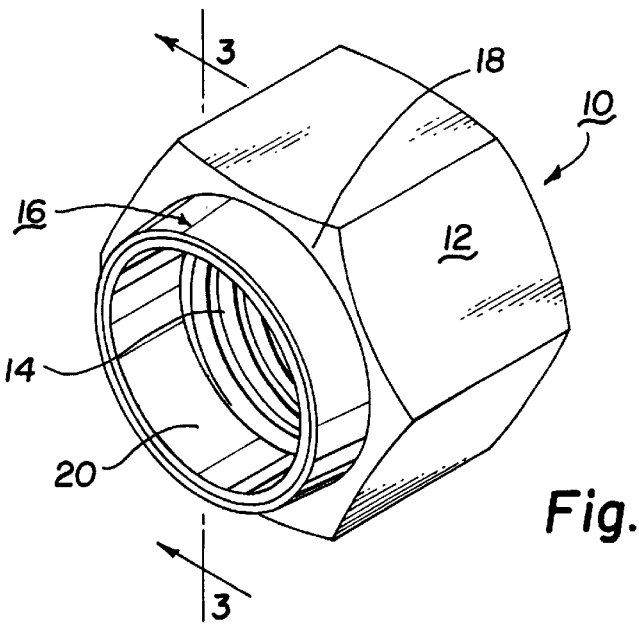
FIG. 1 is an isometric front view of a lock nut constructed in accordance with the invention.

In the description which follows, like parts are marked throughout the specification and drawings with the same reference numerals respectively. The drawing figures are not necessarily to scale and in certain views, proportions may have been exaggerated for purposes of clarity.

Referring now to FIG. 1, the lock nut hereof is designated 10 and is formed of a standard nut 12 having internal threads 14 to which a metal extension or nose 16 is secured to the front face 18 for containing an insert ring 20 affording the lock nut feature hereof. To fabricate lock nut 10, there is utilized a standard IFI rated metal nut 12, which for any given size of nut, includes a standard height "A" and a standard length of metal threads 14.

The first manufacturing step in forming the lock nut 10 is to provide an annular groove or recess 22 formed axially inward in front face 18 concentric with threads 14 and located so as to preferably be of near maximum. diameter thereat. The depth of groove 22 is designated "B", as will be explained, is of a thickness able to receive and afford a contiguous clearance tor an annular metal ring 24 of thickness "t". The variation of thickness "t" depends largely on the selected nut size upon which ring 20 is to be inserted as for example:

| Standard Nut Size (inches) | Ring 24 Thickness (t) (inches) |
|---|---|
| 1/4"–7/8" | 1/32" |
| 1"–1 1/8" | 1/16" |
| 1 1/4"–1 3/8" | 3/32" |
| 1 1/2"–4" and over | 1/8" |

Figure 2:
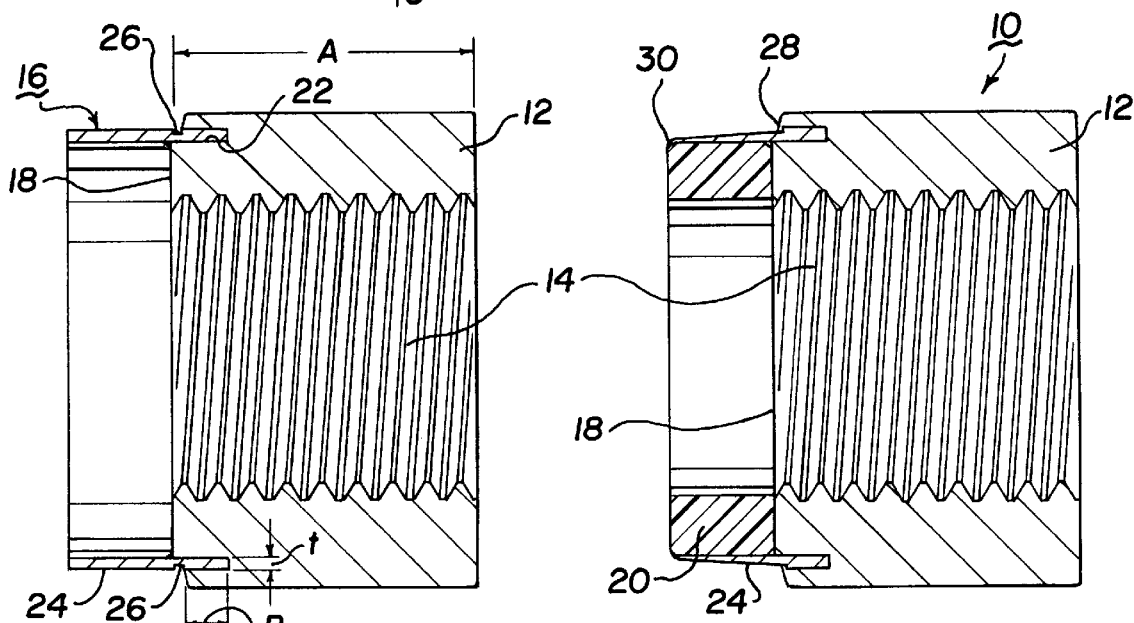
FIG. 2 is a sectional elevation illustrating a step in the formation of the lock nut of FIG. 1.
Figure 3:
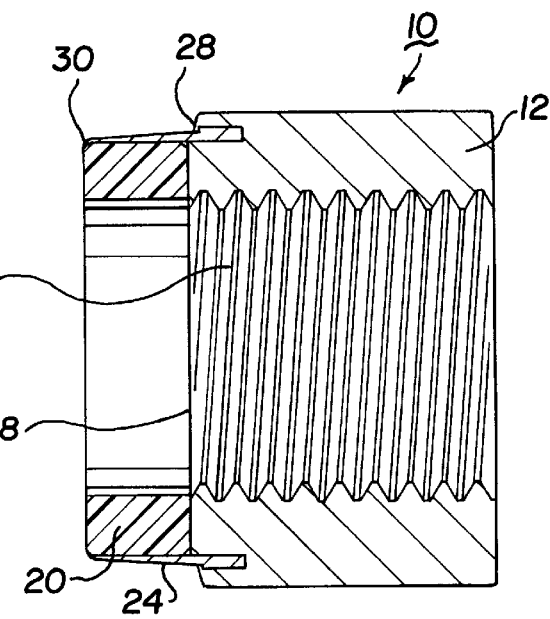
FIG. 3 is a sectional elevation as seen substantially along the lines 3—3 of FIG. 1.

As best seen in FIG. 2, metal ring 24 includes an annular recess 26 such that when ring 24 is seated in groove 22 at depth "B" the recess 26 will be at a height corresponding generally with the end face 18 of nut 12 thereat. The end face is then coldworked into the recess 26 so as to effect a mechanical grip thereof as best seen at 28 in FIG. 3. Thereafter an insert ring 20, preferably of nylon and forming the lock nut feature hereof is inserted within metal ring 24 until its inside edge is seated against front end face 18 of nut 12. With insert ring 20 in place, metal ring 24 is then cold rolled about end 30 in order to effect a fold-over compressive grip about ring 20. At that point, the lock nut product 10 hereof is complete unless otherwise modified as illustrated in FIG. 4.

Figure 4:
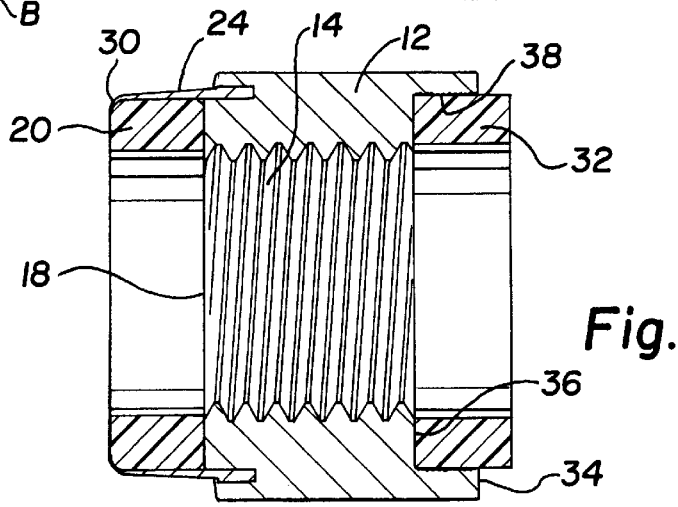
FIG. 4 is a sectional elevation of a modified lock nut hereof to which a buffer ring has been added for sealing the nut when installed.

As illustrated in FIG. 4, there is provided a compressive seal ring 32 within the back face 34 of the nut. When ultimately mounted, the seal ring will incur compression in effecting a resilient seal with the receiving structure against which it is disposed. To accommodate ring 32 that may, for example, be of a suitable compressive poly composition, nut 12 is provided with an annular counter bore 36 within back face 34. The interior face of the counter-bore is knurled at 38 enabling ring 32 to be annularly placed and secured therein. While some thread length is sacrificed in this embodiment to accommodate ring 32, the overall standard height of nut 12 remains constant.

By the above description there is disclosed a novel plastic insert lock nut which enables adding the insert to an otherwise standard nut size without sacrificing either metal thread length or the nut height for any given nut size. The method hereof can be applied to a standard nut without disturbing or eliminating any of the existing nut threads in the manufacturing process or damaging any heat treated or alloyed steels since no welding or heating is required in carrying out the process. Yet the lock nut feature can readily be applied to a customer's special threaded part or nut as a lock only feature. The feature per se can be applied to even small nut quantities yet by virtue of its simplicity, can still be economically feasible. Various types of inserts 20 such as nylon, poly, teflon, neoprene and even metals can be readily installed in accordance therewith.

Not only is the foregoing readily achieved in accordance with the invention but incident thereto by virtue of the nose like addition to an otherwise standard nut, additional threads in ring 20 are provided when installed that extend the number of threads of the standard nut by 2–5 or more depending on the width of nose 16 that is utilized. The feature can also be applied to the top of sealing nuts and lock nuts having bearing locking type features. Such features are achieved as set forth above, with a manufacturing process far less expensive to conduct than are processes for the standard dimension nylon insert products currently available.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A method of converting a standard nut to a lock nut comprising the steps of:

a) providing a standard nut to be converted;

b) forming a concentric groove in an end face of the standard nut of predetermined thickness and depth;

c) providing a metal ring of thickness capable of being received in said groove and of height when received in said groove having a distal edge extending beyond the end face of the nut, said metal ring including an annular recess about its periphery at a height juxtaposed to the end face of the nut;

d) inserting said metal ring in said grooves;

e) working the end face of said nut annularly continous into said recess to effect a radially secured axially interlocking relation therebetween;

f) providing a locking element receivable within the height of said metal ring beyond the end face of said nut; and g) securing said metal ring and said locking element together in a secured relation.

2. The method in accordance with claim 1 in which said locking element comprises a locking ring of predetermined height defining a distal edge and the step of providing said locking element includes inserting said locking ring within the height of said metal ring beyond the end of said nut and the step of securing said metal ring to said locking element includes the step of working said metal ring about said locking ring into a compressive gripping relation therewith.

3. The method in accordance with claim 2 in which the step of working said metal ring includes folding said metal ring about the distal edge of said locking ring thereat to effect said compressive relation.

4. The method in accordance with claim 3 in which the composition of said locking ring is selected from the group consisting essentially of nylon, poly, teflon, neoprene and metals.

5. A lock nut comprising:

a) a standard metal nut having a standard length of internal metal threads and of a standard height defining opposite end faces;

b) a nose extension comprising a metal ring coaxially extending beyond a first end face of said nut and containing an annular recess at a height juxtaposed to the first end face of said nut, said nose extension being secured to said nut by metal of said nut extending cold worked continuously within the recess of said nose extension so as to be in a radial interfit effecting an axially interlocking relation therebetween; and c) a locking element disposed within said extension for effecting threaded engagement with the bolt threads of a bolt on which said lock nut is to be utilized.

6. A lock nut in accordance with claim 5 in which said locking ring is secured to said metal ring in a gripping relation therewith.

7. A lock nut in accordance with claim 6 in which said metal ring secures said locking ring in a compressive gripping relation therewith.

8. A lock nut in accordance with claim 7 including a gasket composition secured in the opposite end face of said nut.

9. A lock nut in accordance with claim 5 in which said standard nut is of a variety selected from the group consisting essentially of jam nuts; heavy nuts, flange nuts, weld nuts, square nuts, high nuts, coupling nuts, hot dip and mechanical galvanide nuts, special nuts, and metric nuts.

10. A lock nut in accordance with claim 5 in which said standard nut is of a composition selected from the group consisting essentially of low carbon steel, medium carbon steel, high carbon steel, stainless steel; monel; brass; bronze; and aluminum alloys.

11. A lock nut in accordance with claim 5 in which said locking ring is of a composition selected from the group consisting essentially of nylon; poly; teflon; neoprene and metals.

* * * * *